Aug. 28, 1934.  G. M. BELLANCA  1,971,637
AIRPLANE CONSTRUCTION
Filed Jan. 10, 1931
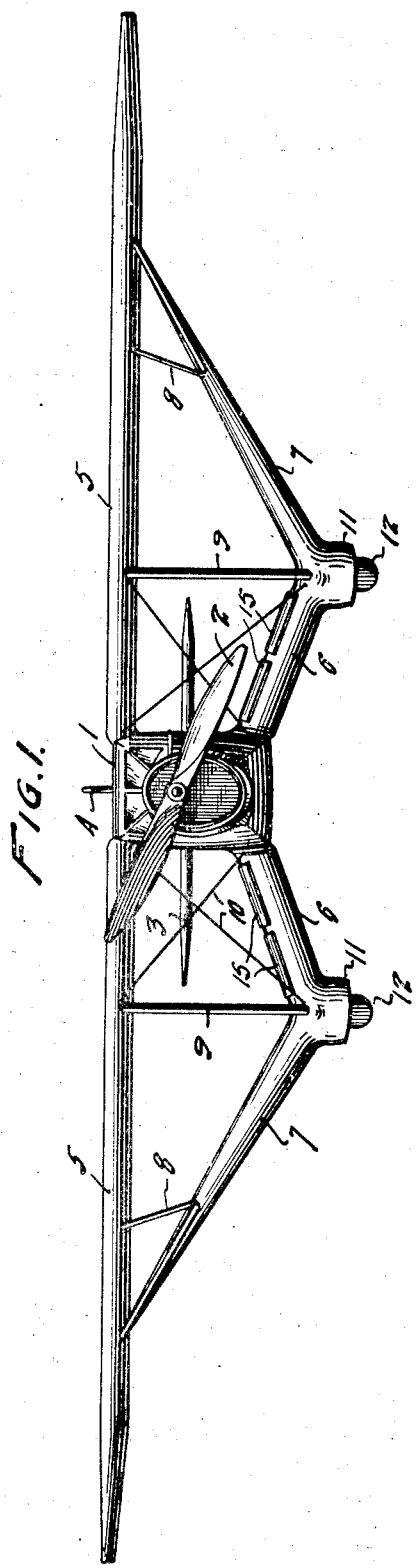
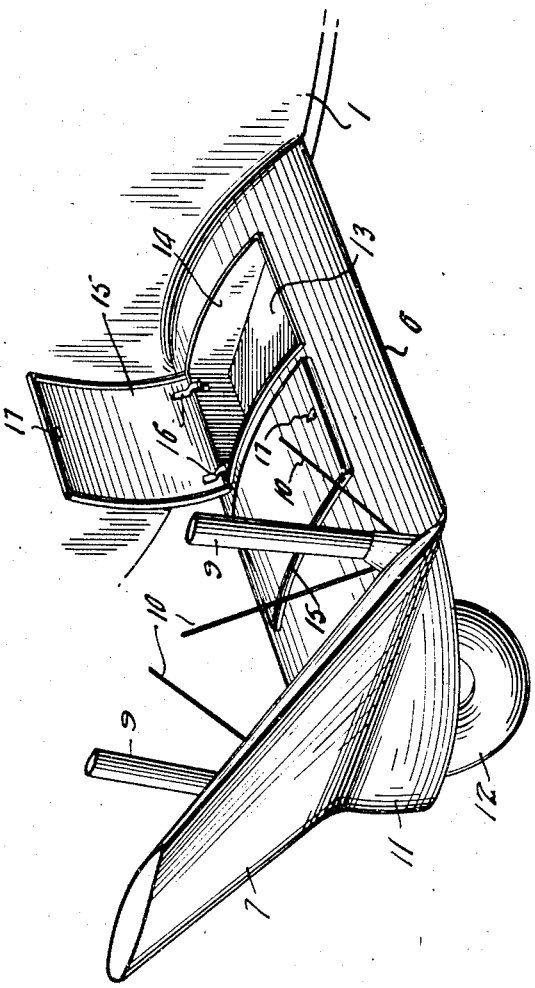
Inventor
GIUSEPPE M. BELLANCA
By Semmes & Semmes.
Attorney Patented Aug. 28, 1934

1,971,637

UNITED STATES PATENT OFFICE 1,971,637

AIRPLANE CONSTRUCTION

Giuseppe M. Bellanca, New Castle, Del.

Application January 10, 1931, Serial No. 507,980

1 Claim. (Cl. 244—30)

This invention relates in general to airplanes and more particularly to an advantageous manner of disposing a load to be carried thereby.

Heretofore it has been customary to dispose baggage, mails, or the loads to be carried by airplanes in a number of different positions, so as to secure the most advantageous results. For example, it has been customary for the most part to place articles to be carried within the fuselage of the ship, utilizing corners and unused space within the fuselage for storing such articles. While this method of disposing an airplane's cargo is satisfactory for certain purposes, it obviously takes up part of the space within the fuselage and materially diminishes the space which could otherwise be used for other purposes, such as the carrying of passengers, etc.

It has also been customary, especially in the case of fighting planes in which the cargo to be carried consists of bombs and the like, to suspend or attach such articles below the fuselage or in some position between the wings of the airplane. This method of disposing a cargo has the obvious disadvantage of increasing the air resistance of the ship very materially and hence retarding its flight. Since the trend in modern air craft building is to do away as far as possible with all parasitic resistance it follows that this manner of disposing of a cargo for an airplane must fall into disuse.

It is further noted that various things, such for instance as the fuel for the airplane motors, have been stored within the upper wings of an airplane, within the tanks, or other receptacles placed therein. This method of disposing of the load to be carried has the disadvantage of raising the resultant center of gravity of the airplane taken as a whole, and hence rendering the same more unstable in flight. It is obviously desirable to lower the center of gravity with respect to the wings rather than to raise the same. This is true in view of the fact that it is well known that a low center of gravity tends to produce stability in an airplane structure.

One of the objects of this invention is to overcome the above and other disadvantages in prior methods of disposal of airplane cargoes.

Another object of this invention is to provide a structure wherein the cargo of an airplane, or at least a portion thereof, will be disposed within the contour of the lower wings.

Yet another object of this invention is to provide a structure wherein the cargo may be disposed within stub wings of an airplane.

Yet another object of this invention is to provide wing struts for supporting the wings of an airplane, which wing struts are adapted to receive a load to be carried and to enclose the same entirely within their regular contour.

Another object of this invention is to provide a means of carrying a load on an airplane below its center of gravity without in any way increasing materially its wind resistance.

A further object of this invention is to provide a structure in which the cargo of an airplane may be disposed entirely within the contour of a wing supporting strut and below the center of gravity of the airplane.

Another object of this invention is to provide an airplane in which the cargo to be carried is adapted to be disposed within a sustaining wing and below the center of gravity of the airplane.

Still another object of this invention is to provide upon an airplane a landing gear strut adapted to receive a load to be carried.

One other object of this invention is to provide a means whereby an airplane's cargo may be carried in a position at each side of and below the fuselage.

With the above and other objects in view this invention consists essentially of an airplane having a fuselage and a pair of main wings extending laterally from points adjacent the top of said fuselage, and of a combined wing supporting strut, landing gear strut, and an airfoil sustaining member for each of said wings, in which there are formed compartments for receiving a cargo to be carried.

To insure a full understanding of my invention and for the purpose of illustrating and describing it so that one skilled in the art to which it pertains may be enabled to understand and practice it, reference is made to the accompanying drawing in which similar numerals indicate corresponding parts.

Figure 1 is a front view of an airplane embodying this invention, and disclosing the general location of the compartments within which the cargo is to be disposed.

Figure 2 is an enlarged detail view of that portion of the airplane in which the cargo receiving compartments of my invention are located.

Referring now more specifically to the drawing and particularly to Figure 1 thereof, there is shown in this figure an airplane having a fuselage 1, and provided with a propeller 2, tail surfaces 3 and 4 and laterally extending sustaining wings 5 of ordinary and conventional construction.

For the purpose of carrying the landing wheels of the airplane and of supporting the sustaining wings 5, there are provided strut members attached to the lower portion of the fuselage immediately beneath the main wings 5 and to the lower surfaces of said main wings at points spaced from the fuselage. These strut members consist of downwardly inclined laterally extending parts 6 and of upwardly inclined laterally extending parts 7 as clearly illustrated in the drawing. The attachment of these members to the lower surfaces of the main wings is made more rigid and secure by means of the bracing members 8 which are attached to the parts 7 intermediate their ends and to the lower surface of the wings at points spaced from the points at which the members 7 are attached thereto. In order to make this arrangement still more secure and to guard against any accidental injury thereto, there are provided rigid braces 9 extending from the points of juncture of the parts 6 and 7 upwardly to the lower surfaces of the main wings. There are also provided wire braces 10 extending between the respective ends of the members 9, and between the ends of said members and the fuselage as shown in the drawing. By these means a very rigid and rugged structure is provided which it is very difficult to distort.

Each strut member which has thus been provided is formed at the juncture of the parts 6 and 7 with a downwardly opening housing 11 adapted to receive a landing wheel 12 which is rotatably supported therein.

Throughout their entire length the members 6 and 7 are preferably formed with airfoil surfaces whereby they are enabled to assist the main wing in supporting the airplane. Thus the members 6 become, in effect, stub wings which materially increase the lifting capacity of the airplane. Furthermore, the upwardly sloping part 7 will tend very materially to stabilize the airplane in its flight and prevent disastrous accidents.

It will thus be seen that strut members have been provided which serve a three fold purpose. The first of these is as a wing strut to support the main wing of the airplane. The second is to serve as a landing gear strut to support the landing wheels 12 of the airplane. The third of these is to serve as a wing member to assist the main wing in sustaining the airplane, and to tend to stabilize the airplane in its flight.

Within the parts 6 of these wing supporting struts there have been formed compartments 13 of whatever shape desired for the purpose of receiving cargo to be carried. These compartments may be formed with side walls 14, and provided with the covers 15 attached to members 6 by hinges 16 and provided with latches 17 for fastening them in closed position. By virtue of these compartments formed within the strut members as shown in the drawing, there has been provided a means whereby an airplane load or cargo may be disposed outside of the fuselage and below the center of gravity without materially increasing the wind resistance of the airplane.

It will be appreciated that I have provided a means for accomplishing this desirable result without increasing the number of parts of the airplane and without weakening the general construction of the airplane taken as a whole.

It will further be appreciated that I have provided for the reception within the wing of an airplane of a part at least of the cargo thereof and for the disposal of said cargo below the center of gravity of the airplane.

It will also be appreciated that I have provided a means whereby a cargo may be carried in an airplane without obstructing the interior of the fuselage, without increasing the wind resistance of the airplane, and without raising the center of gravity or the weight of the airplane. It is noted that the center of gravity of the airplane, instead of being raised, is in fact lowered when the airplane is loaded. This is obviously as it should be as has hereinbefore been pointed out.

While I have shown and described one embodiment of my invention, I wish it to be clearly understood that such showing and description is for the purpose of illustration only and is not to be interpreted as in any manner limiting the scope of my invention. It is understood that the scope of this invention is to be limited only by the prior art and by the terms of the appended claim.

I claim:

In combination with an airplane having a fuselage and wings, stub wings of negative dihedral attached to each side of the fuselage, said stub wings each being formed with baggage compartments within its regular contour, said compartments being adapted to receive a load to be carried, lift wings of appreciable chord and span attached at one end to the end of the stub wing and at the other end to the underside of the main wing and landing gear attached directly to the stub wings.

GIUSEPPE M. BELLANCA.